United States Patent
Caselli et al.

(10) Patent No.: US 7,522,071 B2
(45) Date of Patent: Apr. 21, 2009

(54) METRIC SAMPLING METHOD

(75) Inventors: Umberto Caselli, Rome (IT); Antonio Mario Sgro, Girifalco (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/532,124

(22) Filed: Sep. 15, 2006

(65) Prior Publication Data
US 2007/0025485 A1 Feb. 1, 2007

(51) Int. Cl.
H03M 7/00 (2006.01)
(52) U.S. Cl. .......................................... 341/50; 341/51
(58) Field of Classification Search .................. 341/50, 341/51, 174
See application file for complete search history.

(56) References Cited

U.S. PATENT DOCUMENTS 4,755,795 A * 7/1988 Page ........................... 341/51
2002/0109621 A1 * 8/2002 Khair et al. ................. 341/174

* cited by examiner

Primary Examiner—Rexford Barnie
Assistant Examiner—Joseph Lauture
(74) Attorney, Agent, or Firm—Garg IP Group, Inc.; Rakesh Garg; Jill Poimboeuf

(57) ABSTRACT

An arbitrary metric stream is processed initially at an interim sampling rate to derive a plurality of samples. The samples are analyzed preferably to determine an estimate of the effective bandwidth of the metric stream. As a result of the analysis, an improved sampling rate is determined and adopted for further sampling. In a preferred embodiment, the improved sampling rate is a function of the effective bandwidth.

3 Claims, 8 Drawing Sheets

METRIC SAMPLING METHOD

FIELD OF THE INVENTION

The present invention relates to the sampling of metrics.

TECHNICAL BACKGROUND

There exist many systems whose activities need to be monitored or recorded. Such systems vary vastly in scale, and might include a computer processor on one hand, or a warehouse or international distribution chain on the other. These systems are commonly arranged to produce metrics representing the various activities of the system which may then be monitored or recorded. It is a fact that the data represented by these metrics can be extremely copious, regardless of the quantity of useful information they comprise. It is common to regularly sample the information provided by the system under inspection, in order to gauge its activity. The choice of sampling rate is potentially problematic however, since if set too low, so that the metrics are only occasionally sampled, brief spikes or dips in measured values may be missed altogether. It is therefore common practice to set a very high sampling rate. This, on the other hand, whilst ensuring that no information is lost, can place a substantial burden on the monitoring or recording system.

In fact it has been observed that once a monitoring regime is introduced its results are generally trusted without further analysis, regardless of whether the sampling rate is in fact optimal. It is virtually unknown for the users of the system to adjust the sampling rate after the system is first set up.

US20040186685A1 provides a method of optimizing a sampling period for a system having at least one measurable system parameter z, including the step of calculating a probability distribution function f(Tz,x). The time Tz,x is a first time that the measurable system parameter z will reach a predetermined system threshold x, given level z. assumes there is a threshold and that the system is not interested in samples that are below this threshold. This method can only be used if the monitoring is threshold based limiting the fields in which it can be uses, and the value of the data generated.

Accordingly, one of the objects of the present invention is to provide a method of processing an arbitrary metric stream which overcomes at least some of the problems associated with the prior art methods.

SUMMARY OF THE INVENTION

The invention processes an arbitrary metric stream initially at an interim sampling rate to derive a plurality of samples. The samples are analyzed preferably to determine an estimate of the effective bandwidth of the metric stream. As a result of the analysis, an improved sampling rate is determined and adopted for further sampling. In a preferred embodiment, the improved sampling rate is a function of the effective bandwidth.

BRIEF DESCRIPTION OF THE DRAWINGS

Preferred embodiments of the present invention will now be described with reference to the accompanying drawings, in which.

DETAILED DESCRIPTION

Figure 1:
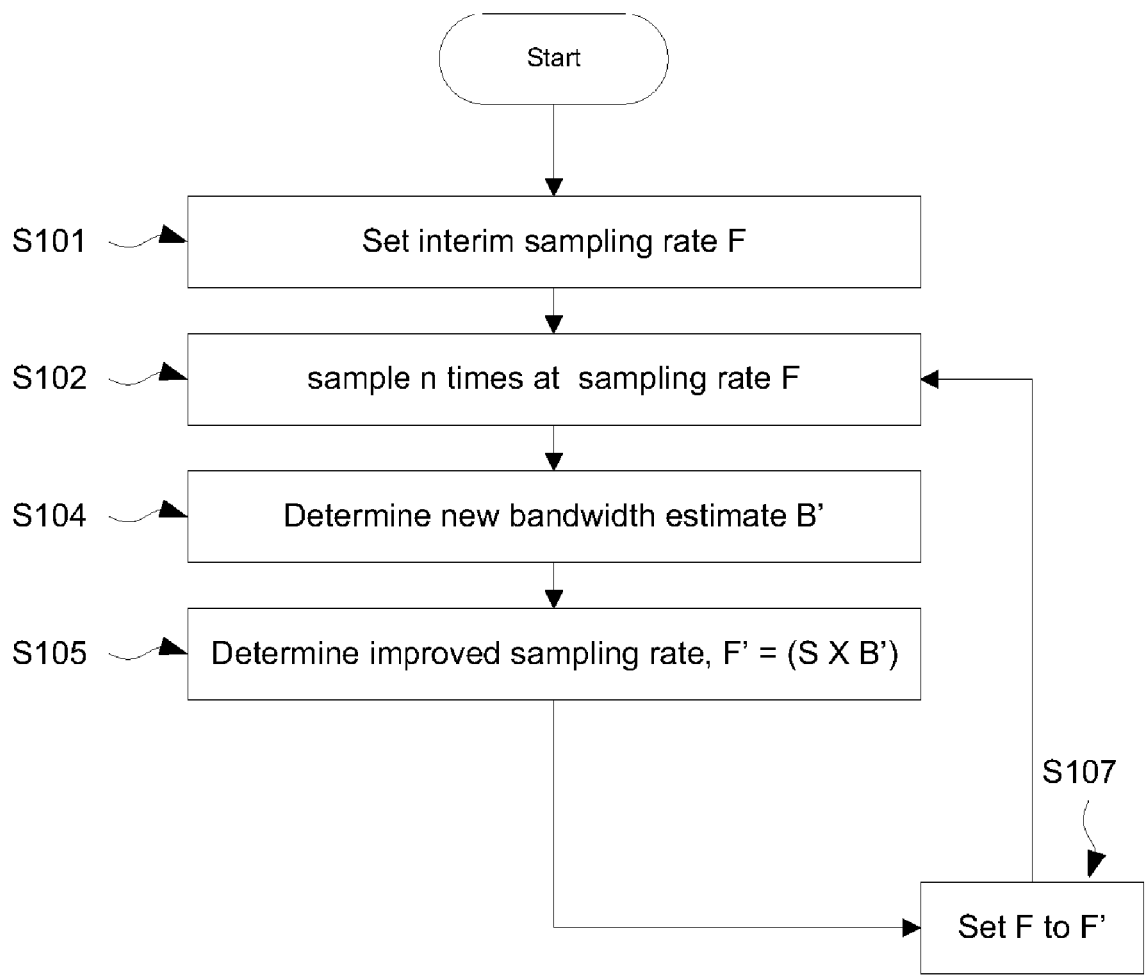
FIG. 1 is a flow chart showing the steps of a first embodiment of the present invention.

FIG. 1 is a flow chart showing the steps of a first embodiment of the present invention. According to this embodiment, a metric stream is sampled at step S102 at an interim sampling rate F to derive a plurality n of samples.

The metric stream may take the form of an analogue or digital signal. It may be derived from a meter or measuring device, or may be manually entered by a human operator. The system to which the metric relates may be remote from the site at which this embodiment is implemented. The system to which the metric relates may itself be distributed or localised.

The interim sampling rate F is determined at step S101, and may be selected for example on the basis of prior knowledge of the system to which the metric relates, or may be selected as a function of the capacities of the means implementing the sampling process, or may be selected at random or according to a default value. Preferably the interim sampling rate is selected as being faster that a predicted optimum sampling rate. Advantageously the interim sampling rate is selected as the highest sampling rate at which the means implementing the sampling process can operate. Advantageously the interim sampling rate is selected as at least twice the expected bandwidth $B_{max}$ of the metric. Still more advantageously the interim sampling rate is selected as at least four times the expected bandwidth $B_{max}$.

The next step, step S104, is the analysis of the n samples to determine an estimate of the effective bandwidth B' of said metric stream. In order to achieve this analysis, the number of samples n taken during the preceding step must be sufficient, the actual number required depending on the technique to be employed in determining the effective bandwidth B', and the degree of resolution required in the sample rate output. In other words, a lower degree of granularity in the determination of the effective bandwidth B'. A number of techniques for determining the effective bandwidth B' of a set of values will occur to the skilled person. For example, an implementation of a Fourier transform may provide the means for deriving a value for the effective bandwidth of the metric stream from the sampled values. Preferably the effective bandwidth B' is determined by means of a Fast Fourier Transform (FFT), according to any of the algorithms that may readily occur to the skilled person. According to the specificities of the FFT algorithm selected, it may be necessary to restrict the number of samples to a power of two. 512 or 1024 samples may prove to be appropriate.

Finally, it is necessary at step S105 to determine an improved sampling rate F' as a function of the effective bandwidth B' at step S104. In view of the Nyquist theorem, in order to recover all components of the metric, it is necessary to sample more than twice as fast as the highest waveform frequency of interest, i.e. at twice the effective bandwidth B'. Preferably the improved sampling rate is set at a higher real number multiple S of the bandwidth. Preferably the improved sampling rate is set at four times the effective bandwidth B'.

At step S107 the sampling rate F is set to the improved sampling rate F', and steps S101 to S107 are then preferably repeated in a loop, ensuring that the sampling rate F is permanently maintained at an optimum level. A delay may be imposed between iterations so as to avert a possibly undesirable drain for example upon system resources. The delay may be fixed, or calculated dynamically for example as a function of the effective bandwidth of the metric, since a high bandwidth signal may require more frequent monitoring.

Figure 2:
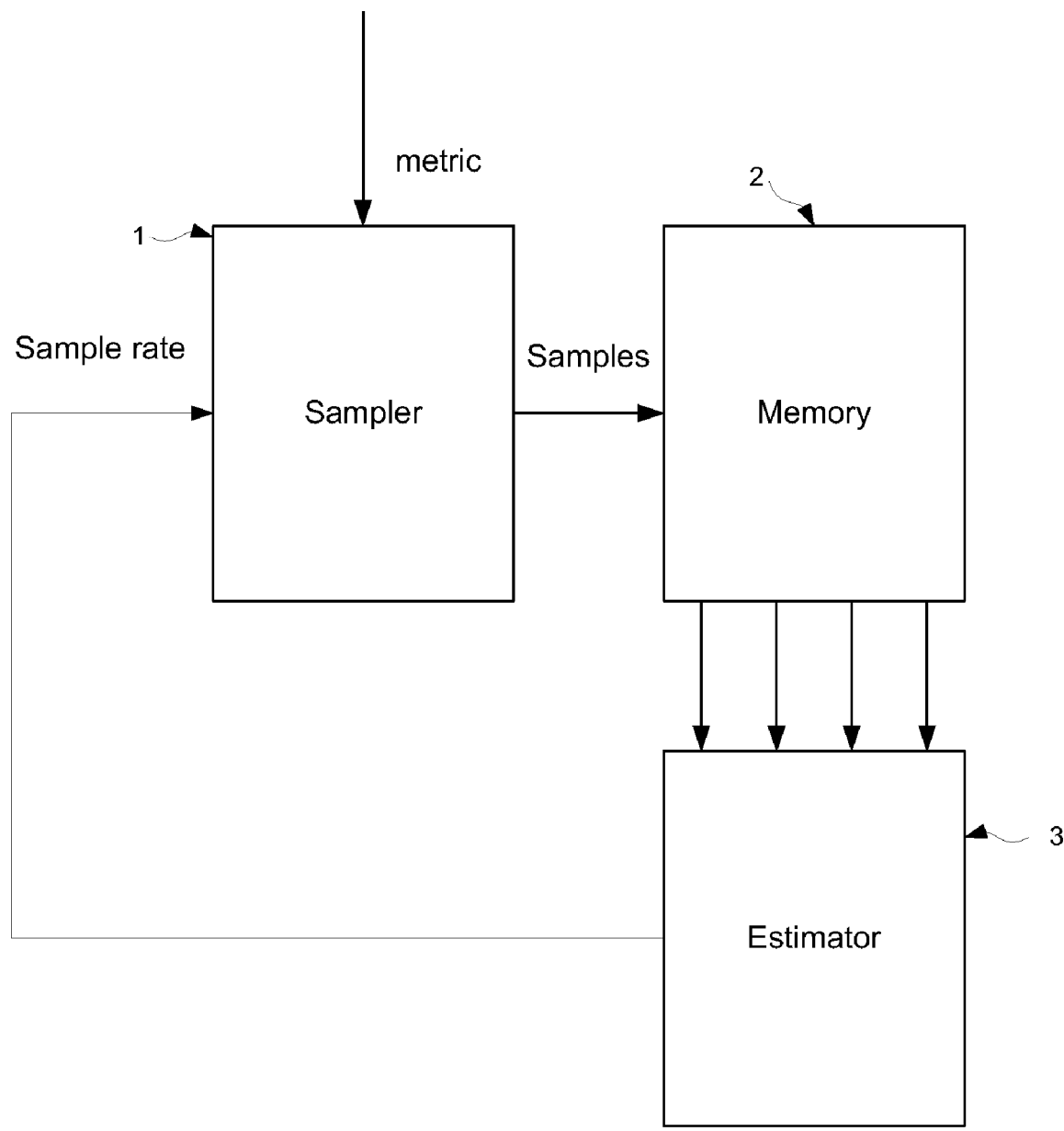
FIG. 2 is a schematic diagram of an apparatus implementing the first embodiment as described above with reference to FIG. 1.

FIG. 2 is a schematic diagram of an apparatus implementing the first embodiment as described above with reference to FIG. 1. This apparatus comprises a sampler 1, a memory 2 and an estimator 3. The sampler 1 is arranged to receive the metric stream, and to extract samples there from at a rate determined according to a signal provided by the estimator 3. The sampler 1 provides the samples to the memory 2, which stores the samples until a predetermined number of samples has been acquired, whereupon the memory 2 is configured to deliver the samples to the estimator 3, which is configured to process the samples in order to determine an effective bandwidth for the metric stream, and on the basis of this determination to establish an improved sampling rate, which it communicates to the sampler 2. Any element may be realised in terms of hardware, firmware, software or a combination of any or all of these. According to one preferred embodiment these functions are all realised by a conventional computer. This implementation is of course particularly advantageous where it is the functions of the computer itself that the metrics reflect.

These apparatus elements may be realised in any of the many ways that will readily occur to the skilled person. The sampler, memory, and estimator may be built up from discrete components according to a circuit designed according to the particular requirements of a given implementation. They may each comprise standard off the shelf components, they may be implemented either individually or together in a customisable platform such as an ASIC (Application Specific Integrated Circuit), FPGA (Field Programmable Gate Array), PLD (Programmable Logic Device) etc. All or part of the apparatus may be implemented by means of a software routine for example running on a microprocessor or other processor, which may equally fulfil other roles besides those of the invention in parallel.

Figure 3:
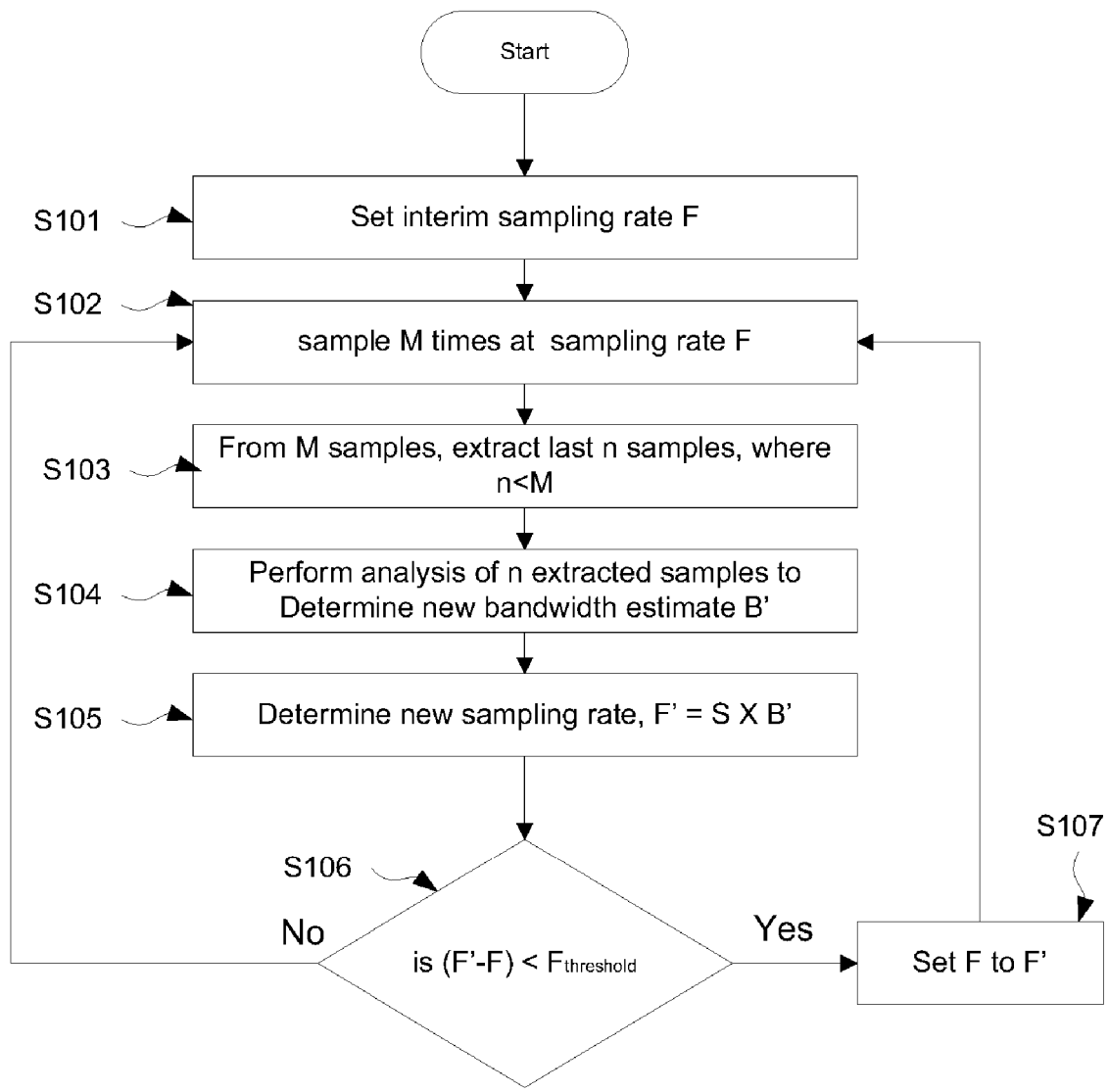
FIG. 3 is a flow chart showing the steps of a second embodiment of the present invention.

FIG. 3 is a flow chart showing the steps of a second embodiment of the present invention. The second embodiment of the invention provides further developments upon the method of the first embodiment.

A first such development is embodied in step S103 which is interposed between steps S102 and S104 as described above with regard to FIG. 1. According to this embodiment at step S103 a number of samples M is extracted from the metric stream, and it is a subset of these samples from which the n samples used in the determination of the effective bandwidth B' at step S104. The rate at which an effective bandwidth can be determined is likely to be substantially constant based on the method by which it is derived, and the hardware carrying out the respective functions. Similarly, as noted above, the number of samples required for such an analysis is also likely to be fixed based on the method by which it is derived. Accordingly, while the sampling rate may vary substantially as the invention is implemented, the rate at which samples are required is substantially unchanged. By calling upon a subset of the available samples according to step S103, the variation in the number of available samples and the rate at which they become available need not affect the rate at which effective bandwidth calculations can be formed.

According to a further embodiment the number of samples used in the calculation of the effective bandwidth may also be varied as a function of the present sampling rate.

A further development is embodied in step S106, which is interposed between steps S105 and S107 as discussed above. According to this embodiment at step S106 a modular difference between the improved sampling rate determined at step S105 and the present sampling rate is established, and the rate difference thus determined is compared to a rate threshold. If the modular rate difference exceeds the rate threshold the improved rate is adopted as the new sampling rate as in the first embodiment. If on the other hand the rate difference falls below the rate threshold no change is made to the present sampling rate. By means of this provision, a situation can be avoided whereby minor changes are constantly made to the sampling rate due to noise in the bandwidth calculation results which do not reflect long term changes in the effective bandwidth.

The threshold may be varied to reflect measurement conditions, and may be continuously recalculated for example so as to reflect a constant fraction of the present sampling frequency. By this means the capacity of the system to adapt to changing conditions with a minimum of user intervention is improved.

Figure 4:
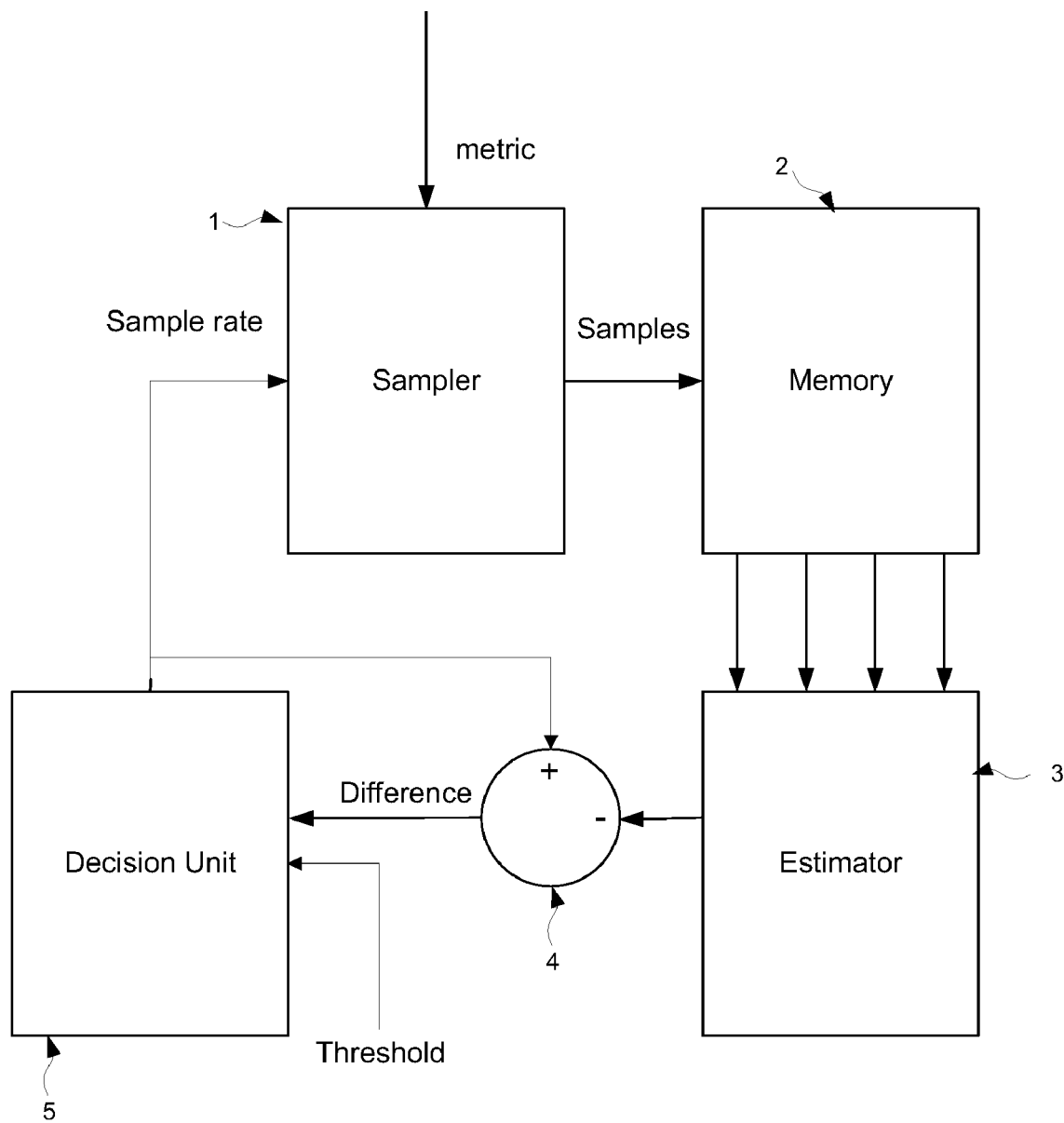
FIG. 4 is a schematic diagram of an apparatus implementing the second embodiment as described above with reference to FIG. 3.

FIG. 4 is a schematic diagram of an apparatus implementing the second embodiment as described above with reference to FIG. 3. This apparatus comprises the sampler 1, memory 2 and estimator 3 of the embodiment of FIG. 2, and further comprises a decision unit 5 and a subtractor 4. According to this arrangement it is the decision unit 5 which provides the sampling rate value to the sampler 1 rather than the estimator 3. The subtractor 4 is configured to subtract the smaller of the improved sampling rate determined by the estimator 3 and the present sampling rate at which the sampler 1 is presently operating from the larger of the two values, so as to derive a difference value. This difference value is fed to a decision unit 5, along with a threshold value. The decision unit is configured to compare the difference value and the threshold value, and in a case where the difference value is found to exceed the threshold value, the improved rate is output to the sampler. Otherwise, where the difference value is found to fall below the threshold value, the sampling rate communicated to the sampler is maintained unchanged.

These apparatus elements may be realised in any of the many ways that will readily occur to the skilled person. The sampler, memory, subtractor and estimator may be built up from discrete components according to a circuit designed according to the particular requirements of a given implementation. They may each comprise standard off the shelf components, they may be implemented either individually or together in a customisable platform such as an ASIC, FPGA, etc. All or part of the apparatus may be implemented by means of a software routine for example running on a microprocessor or other processor, which may equally fulfil other roles besides those of the invention in parallel.

Figure 5A:
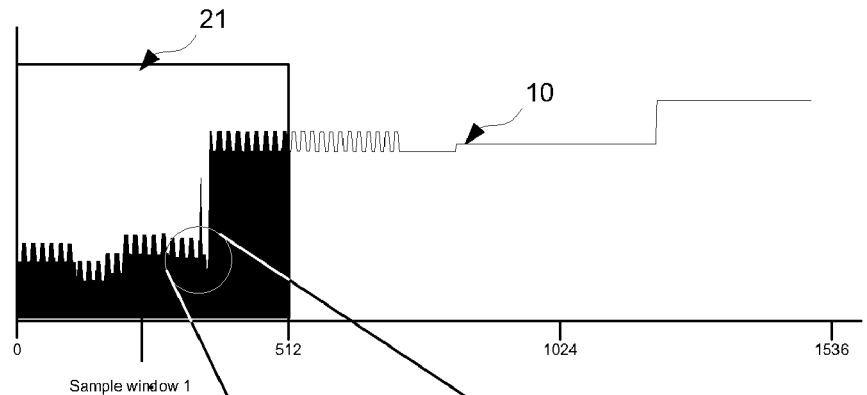
FIGS. 5*a* to 5*d* illustrate the principles underlying the present invention, and show possible results that may be achieved by implementing the heretofore described embodiments.
Figure 5B:
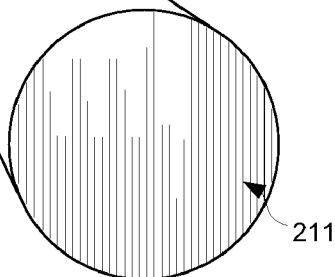
Figure 5C:
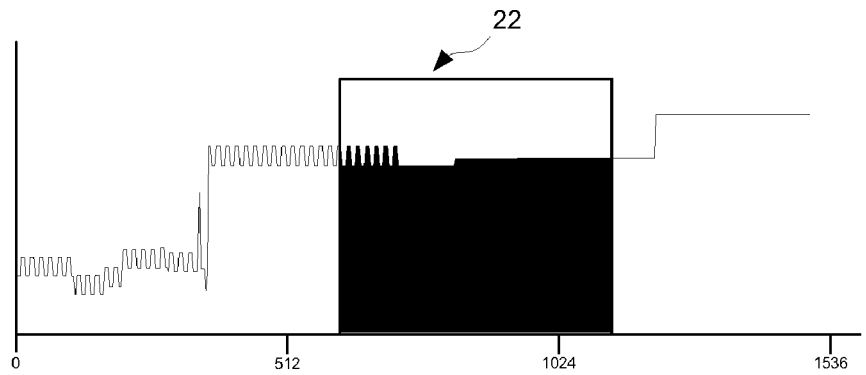
Figure 5D:
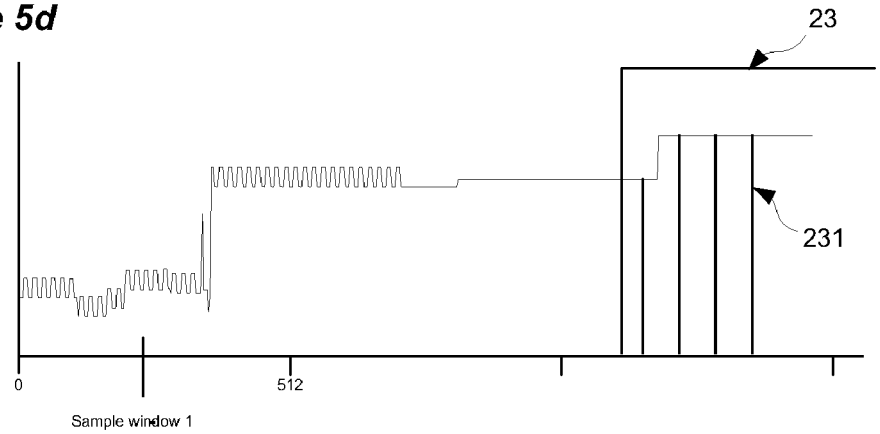

FIGS. 5a to 5d illustrate the principles underlying the present invention, and show possible results that may be achieved by implementing the heretofore described embodiments. Specifically, in FIGS. 5a, 5c and 5d the line 10 represents a series of metric values. In this case, the values might represent for example the level of memory usage in a computer system. The boxes 21, 22 and 23 in FIGS. 5a, 5c and 5d represent complete consecutive sets of samples which are processed according to one of the above described embodiments.

FIG. 5b shows a magnified view of part of the box 21 of FIG. 5a, in which the individual samples which are extracted, such as sample 211, from the metric stream are shown. According to this example, a complete sample set may comprise 512 samples. It may be assumed that sample sets preceding set 21 exhibited a corresponding degree of activity, and hence a similar effective bandwidth, so that the sampling rate in FIGS. 5a and 5b can be seen to reflect fully the data present in the metric flow. In FIG. 5c meanwhile it can be seen that far less activity is visible the latter half of the sample set, since the memory usage can be seen to be more stable. Accordingly, when a bandwidth analysis of these values is performed, a lower effective bandwidth will be determined. This lower bandwidth leads to the selection of a lower sampling rate, which is in turn visible in FIG. 5d, in which 231 represents a single sample. Clearly as shown in FIG. 5d the lower sampling rate suggests that it will take correspondingly longer to form a complete sample, although solutions to this effect are described above.

The present invention is suitable for use in conjunction with any system whose activities need to be monitored or recorded. Such systems may vary vastly in scale, and might include a computer processor on one hand, or a warehouse or international distribution chain on the other. The metrics monitored may be considered any time variant value which may relate for example to a resource. In the context of a computer system, a resource may be anything that affects the operation of that system and may include physical and logical disks, CPUs, memory, printers, as well as the processes and services running, such as LanMan, the Windows® event log, the UNIX (logging system daemon) syslogd, or TCP/IP.

Embodiments of the invention can be implemented at design time, and thereby incorporated into a product or system so as to optimise its eventual performance. Alternatively, an existing product or system can be augmented by adding functionality according to an embodiment of the present invention, for example in the form of a "bolt-on" hardware module, a firmware up grade or the modification or patching of a software routine. Still further, the determination of an optimum sampling rate for a particular metric flow may be proposed as a service, for example whereby a third party may submits real time or recorded data for analysis, and in return receives information defining an optimum sampling rate. This information may be transmitted in such a form as to automatically cause a remote sampling means to adjust its sampling rate, or in a human readable form enabling an operator to adjust lettings locally.

It should be noted that the respective location of the various elements is subject to substantial variation. FIGS. 6a to 6e exhibits a number of possible distributions of the functional elements of the foregoing embodiments. In FIGS. 6a to 6e, the sampler 1, memory 2, subtractor 4 and estimator 3 and decision unit 5 are arranged in the same manner as described with respect to FIG. 4. FIGS. 6a to 6e further shows schematically a monitored system 10, and a metric source 11. The monitored system 10 extends to any system from which metrics may be derived, as discussed above and without limitation. The Metric source represents a point at which the metric data to be sampled is available. This might be a function or API call of an operating system, it might be a gauge or meter in an industrial installation, it may be an individual whose knowledge can be polled, etc.

Figure 6A:
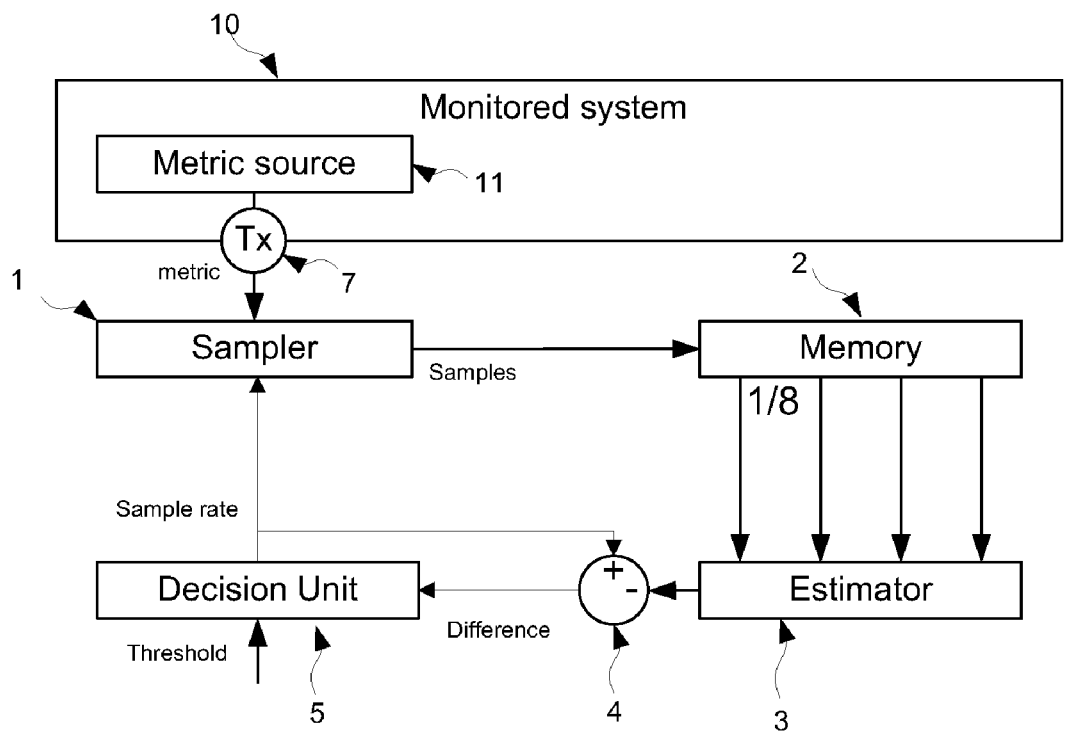
FIGS. 6*a* to 6*e* exhibits a number of possible distributions of the functional elements of the foregoing embodiments

FIG. 6a shows a first variant of the arrangement of FIG. 4, in which the sampler 1, memory 2, subtractor 4 and estimator 3 and decision unit 5 are provided outside the monitored system. There is further provided an output interface or transmitter Tx, 7, which performs the task of compiling as necessary and submitting the metric stream for sampling by the sampler 1. The output of the transmitter may comprise a continuous flow of serial or parallel data. The data may be transmitted by any means, including a wired or wireless network, by optical or electrical means, the transmission may take place over the internet, a conventional or cellular telephone system, either on a voice, data or control channel. The information may be relayed verbally, by a written or printed message, by facsimile or any other appropriate means of communication. The data may be packetised, and may be synchronous or asynchronous. It may be provided with overhead information such as a timestamp, serial code, clock information, or error correction information.

Figure 6B:
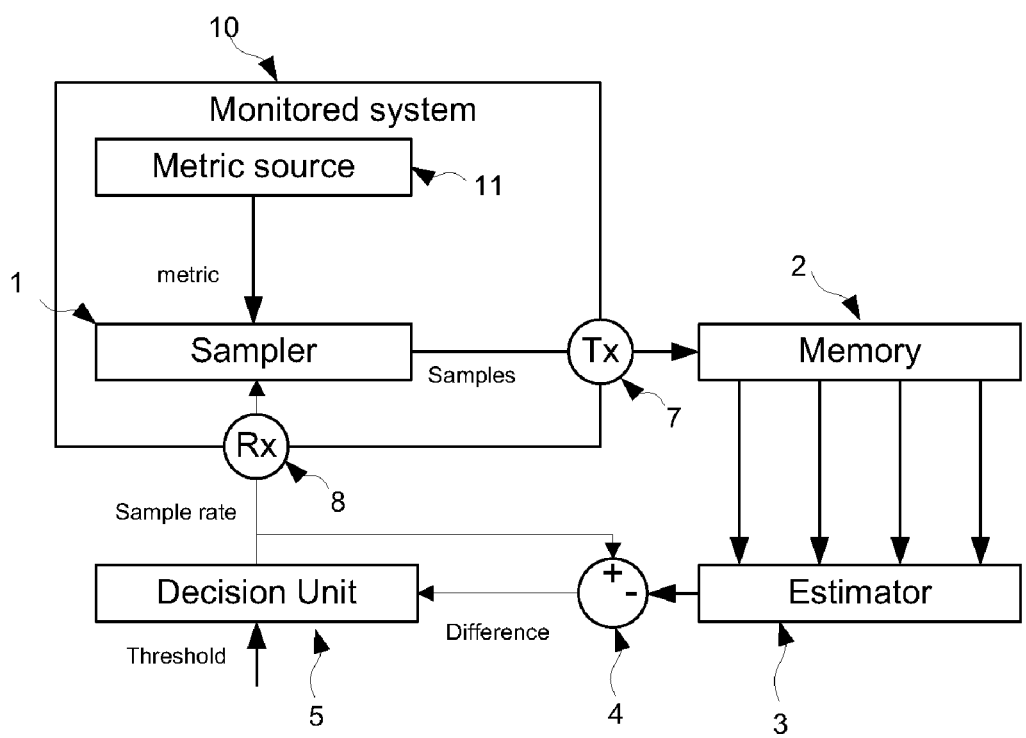

FIG. 6b shows a second variant of the arrangement of FIG. 4, in which the sampler 1 is incorporated in the monitored system 10, and the memory 2, subtractor 4 and estimator 3 and decision unit 5 are provided outside the monitored system 10. In this variant the output interface or transmitter Tx, 7, is provided between the sampler 1 and the memory unit 2 to perform the task of compiling as necessary and submitting the sample data for storage at the memory. The output of the transmitter may take any of the forms described with respect to FIG. 6a. The data may be compressed or encrypted. According to this embodiment there is further provided an input interface or receiver Rx, 8, which is provided between the decision unit and the sampler, so as to receive instructions from the decision unit at to the required improved sampling rate, which is then relayed to the sampler, which is designed so as to adapt its sampling rate in response to this instruction. The improved sampling rate instruction can be of any suitable for as will readily occur to the skilled person, and may for example include any of the forms mentioned above with respect to the transmitted data.

Figure 6C:
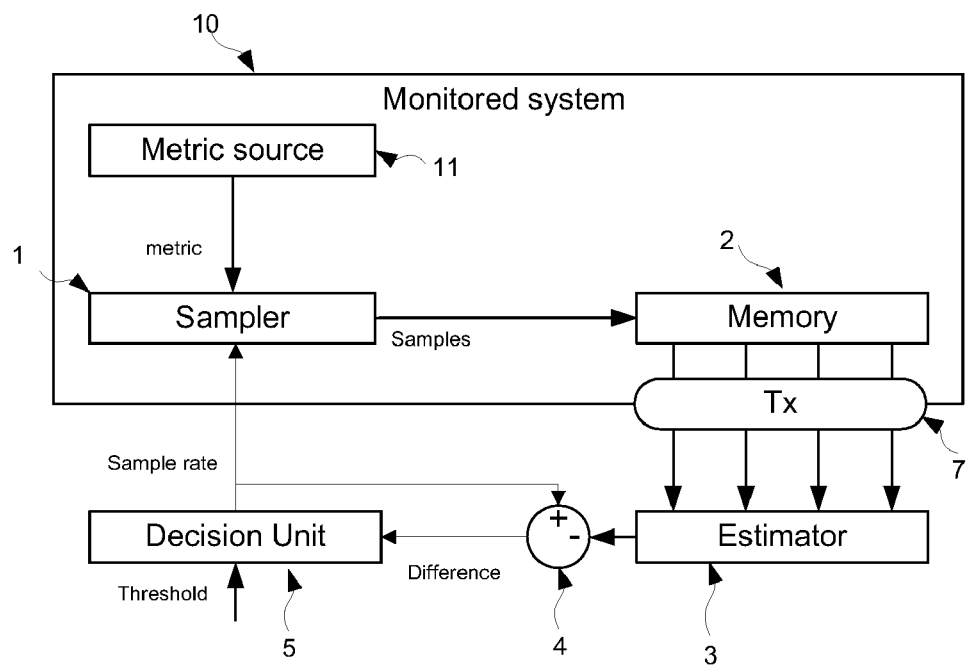

FIG. 6c shows a third variant of the arrangement of FIG. 4, in which the sampler 1 and the memory 2 is incorporated in the monitored system 10, and the subtractor 4, estimator 3 and decision unit 5 are provided outside the monitored system 10. In this variant the output interface or transmitter Tx, 7, is provided between the memory unit 2 and the estimator 3 to perform the task of compiling as necessary and submitting the sample data for bandwidth analysis at the estimator 3. The output of the transmitter may take any of the forms described with respect to FIG. 6b. The memory preferably collects sufficient information for an effective bandwidth analysis, and according to the embodiment of FIG. 6c sufficient information for an effective bandwidth analysis is preferably transmitted to the estimator in one transmission. Where sufficient information for an effective bandwidth analysis is preferably transmitted to the estimator in one transmission, the information may be encapsulated such that it is defined as a contiguous unit. According to this embodiment there is further provided an input interface or receiver Rx, 8, as discussed above with respect to FIG. 6b.

Figure 6D:
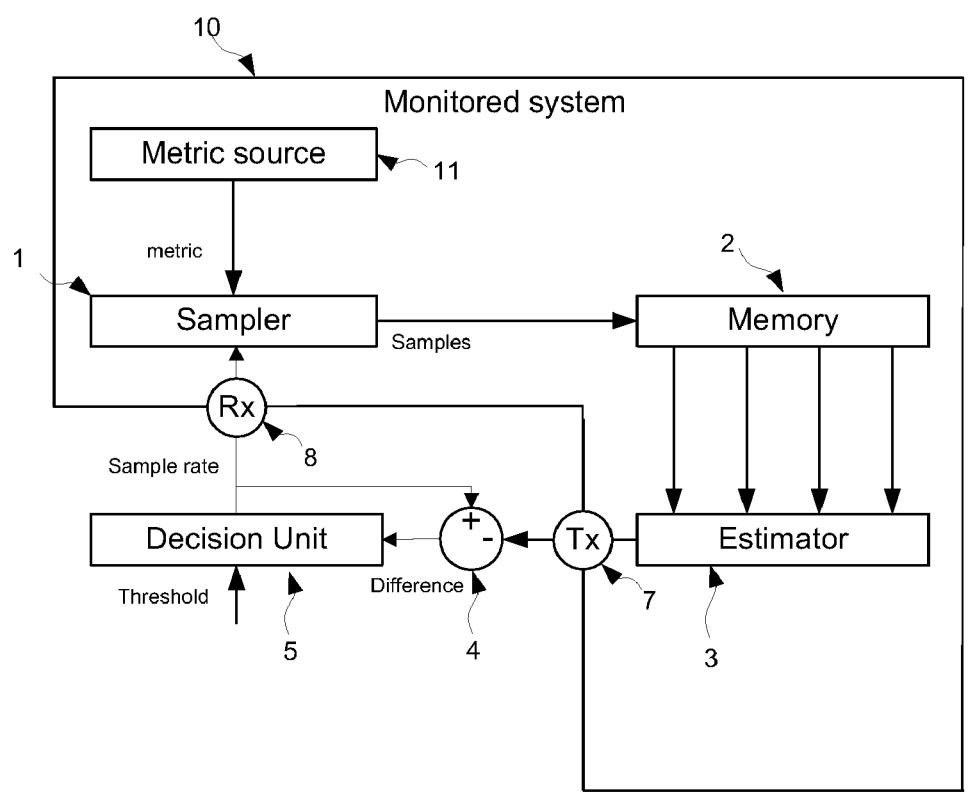

FIG. 6d shows a fourth variant of the arrangement of FIG. 4, in which the sampler 1, memory 2 and estimator 3 are incorporated in the monitored system 10, and the subtractor 4, and decision unit 5 are provided outside the monitored system 10. In this variant the output interface or transmitter Tx, 7, is provided between the estimator 3 and the subtractor 4 to perform the task of compiling as necessary and submitting the improved sampling rate data to the subtractor 4. As described in preceding embodiments, the subtractor determines the modular difference between the present, interim, sampling rate and the improved sampling rate proposed by the estimator. The output of the transmitter may take any of the forms described with respect to FIG. 6b. According to this embodiment there is further provided an input interface or receiver Rx, 8, as discussed above with respect to FIG. 6b.

Figure 6E:
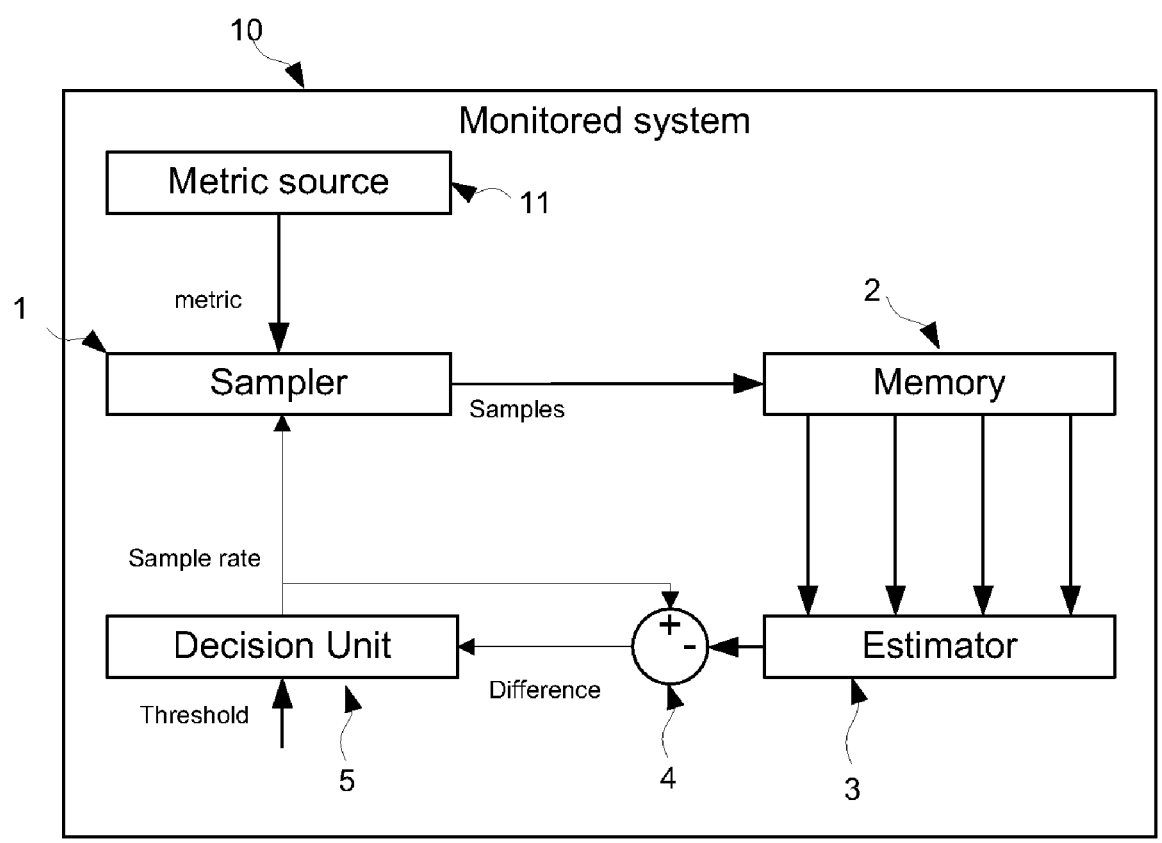

FIG. 6e shows a fifth variant of the arrangement of FIG. 4, in which the sampler 1, memory 2, estimator 3, subtractor 4, and decision unit 5 are all incorporated in the monitored system 10. This arrangement does not therefore call for the transmitter or receiver.

Any of the functional elements described above may be provided with means for storing information gathered and generated by that or other functional units as required for future reference and analysis, and may be submitted for further processing, for example in a supervising application. In particular, such embodiments will be in a position to detect changes in the effective bandwidth of the metrics, which may in itself reflect important changes in the status of the system to which the metrics relate. For example, a sudden increase in effective bandwidth may indicate a loss of stability or synchronisation in the system to which the metrics relate. Such a determination can be reported as necessary.

The present invention may be integrated so as to form a part of such a supervising application, so as to apply best practices to the automated monitoring of essential system resources. The application may detect bottlenecks and other potential problems and provide for the automatic recovery from critical situations, which eliminates the need for system administrators to manually scan through extensive performance data.

In the case of the variants of FIGS. 6a to 6d, the functions performed by the functional elements outside the monitored system may be offered as a commercial service to any party operating a system suitable for surveillance according to the present invention.

In the case of the variants of FIGS. 6a to 6e, a commercial service may be offered to any party operating a system suitable for monitoring according to the present invention of installing and or configuring the functional elements situated inside the monitored system.

An embodiment may comprise a further step of issuing an invitation to submit metrics for analysis. This may take the form of a firmware or software update incorporating the facility to implement relevant functional elements for example according to one of the variants of FIGS. 6a to 6e as discussed above. Such an invitation may be issued by means of a broadcast, i.e., a general offer to any potentially interested party. A standard format may be defined according to which data may be transmitted by the transmitter Tx, 7, as discussed above to a central processing station for processing according to the present invention on an ad hoc basis.

Further embodiments comprise a method or system for optimising the sampling of an arbitrary metric stream, according to which samples are sampled from the metric stream and used to determine an estimate of the effective bandwidth of the metric stream, for example by means of a fast Fourier transform. The estimated effective bandwidth is then used to determine an optimal sampling rate, which may then be used for future sampling of the metric stream. Some parts of the processing may take place remotely.

As a further embodiment there is provided a sampling system comprising a sampler configured to sample an arbitrary metric stream at an interim sampling rate, a memory configured to store a plurality of sample values output from said sampler, and an estimator configured to determine an effective bandwidth of said metric stream from values stored in said memory, and to determine an improved sampling rate as a function of said effective bandwidth. As a development of this embodiment, the system may further comprise a comparator configured to determine the difference between said interim sampling rate and said improved sampling rate and a decision unit configured to set the sampling rate of said sampler to said improved sampling rate in a case where said difference exceeds a first threshold.

The preceding embodiments provide a number of different combinations of features. It should be understood that these features may be combined in many other ways. For example, although the features of comparing the difference between an improved sampling rate and the interim sampling rate on the one hand, and of discarding a number of samples prior to processing on the other are both introduced in the second embodiment, these features are clearly independent and may be included or omitted from other embodiments freely and independently. Similarly, it will be appreciated that the order in which the steps are carried out can be varied extensively without interfering with the realisation of the present invention. For example, it would be quite possible to compare effective bandwidths rather than the corresponding ideal sampling rates. Many other such variations will occur to the skilled person.

Any element may be realised in terms of hardware, firmware, software or a combination of any or all of these. Where software components are provided, they may be placed temporarily or permanently on a carrier, such as an optical disc such as a CD or DVD, a magnetic disc such as a hard drive or floppy disc, a memory device such as a flash memory card, EPROM, volatile memory unit etc., or an optical, electrical, radio or other transmission channel, for example for the purposes of distribution.

The invention claimed is:

1. A method of processing an arbitrary metric stream, comprising the steps of:
   sampling at a sampler said metric stream at an interim sampling rate to derive a plurality of samples;
   submitting details of said samples for analysis;
   receiving an instruction specifying an improved sampling rate;
   adopting said improved sampling rate at the sampler for further sampling;
   calculating the difference between said interim sampling rate and said improved sampling rate; and
   in a case where said difference is greater than a first threshold changing the interim rate to equal the improved sampling rate for further sampling, or in a case where said difference is less than said first threshold continuing to sample at the interim rate.

2. The method of claim 1 wherein if said difference is greater than said first threshold, said steps of sampling, analysing, determining and calculating are repeated until a further sampling rate is determined such that the difference between said interim sampling rate and said further rate is less than said first threshold.

3. The method of claim 1 wherein if said difference is less than said first threshold, said steps of sampling, analysing, and calculating are repeated after a predetermined interval.

* * * * *